United States Patent
Sun et al.

(10) Patent No.: US 10,460,729 B1
(45) Date of Patent: Oct. 29, 2019

(54) BINARY TARGET ACOUSTIC TRIGGER DETECTON

(71) Applicant: Amazon Technologies, Inc., Seattle, WA (US)

(72) Inventors: Ming Sun, Winchester, MA (US); Aaron Lee Mathers Challenner, Cambridge, MA (US); Yixin Gao, Malden, MA (US); Shiv Naga Prasad Vitaladevuni, Belmont, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/639,254

(22) Filed: Jun. 30, 2017

(51) Int. Cl.
  *G10L 15/22* (2006.01)
  *G10L 25/30* (2013.01)
  *G10L 15/02* (2006.01)
  *G10L 15/16* (2006.01)

(52) U.S. Cl.
  CPC ............ *G10L 15/22* (2013.01); *G10L 15/02* (2013.01); *G10L 15/16* (2013.01); *G10L 25/30* (2013.01); *G10L 2015/025* (2013.01); *G10L 2015/223* (2013.01)

(58) Field of Classification Search
  CPC ........ G06N 99/005; G06N 3/02; G10L 15/22; G10L 15/16; G10L 2015/088; G10L 2015/223
  See application file for complete search history.

(56) References Cited

U.S. PATENT DOCUMENTS

| 9,582,762 | B1* | 2/2017 | Cosic | G06N 5/04 |
| 2014/0337030 | A1* | 11/2014 | Lee | G10L 15/08 704/251 |
| 2016/0283841 | A1* | 9/2016 | Sainath | G06N 3/0454 |
| 2017/0140771 | A1* | 5/2017 | Taniguchi | G10L 15/05 |
| 2017/0148429 | A1* | 5/2017 | Hayakawa | G10L 15/02 |
| 2018/0075867 | A1* | 3/2018 | Dahl | G10L 25/84 |

OTHER PUBLICATIONS

Vijayaditya Peddinti et al., "Reverberation robust acoustic modeling using i-vectors with time delay neural networks", 2015, pp. 1-5.*
Daniel Garcia-Romero et al., "Stacked long-term TDNN for Spoken Language Recognition", Sep. 2016, pp. 3226-3330.*
(Continued)

*Primary Examiner* — Richemond Dorvil
*Assistant Examiner* — Mark Villena
(74) *Attorney, Agent, or Firm* — Occhiuti & Rohlicek LLP

(57) ABSTRACT

A method for selective transmission of audio data to a speech processing server uses detection of an acoustic trigger in the audio data in determining the data to transmit. Detection of the acoustic trigger makes use of an efficient computation approach that reduces the amount of run-time computation required, or equivalently improves accuracy for a given amount of computation, by using a neural network to determine an indicator of presence of the acoustic trigger. In some example, the neural network combines a "time delay" structure in which intermediate results of computations are reused at various time delays, thereby avoiding computation of computing new results, and decomposition of certain transformations to require fewer arithmetic operations without sacrificing significant performance.

19 Claims, 8 Drawing Sheets

(56) References Cited

OTHER PUBLICATIONS

Peddinti, V., Povey, D., & Khudanpur, S. (2015). A time delay neural network architecture for efficient modeling of long temporal contexts. In INTERSPEECH (pp. 3214-3218).

Tucker, G., Wu, M., Sun, M., Panchapagesan, S., Fu, G., & Vitaladevuni, S. (2016). Model Compression Applied to Small-Footprint Keyword Spotting. In INTERSPEECH (pp. 1878-1882).

Sainath, T. N., & Parada, C. (2015). Convolutional neural networks for small-footprint keyword spotting. In Sixteenth Annual Conference of the International Speech Communication Association, 3 pages.

Chen, G., Parada, C., & Heigold, G. (May 2014). Small-footprint keyword spotting using deep neural networks. In Acoustics, Speech and Signal Processing (ICASSP), 2014 IEEE International Conference on (pp. 4087-4091). IEEE.

\* cited by examiner

BINARY TARGET ACOUSTIC TRIGGER DETECTON

BACKGROUND

This invention relates to locating acoustic triggers, and more particularly to selective transmission of audio data based on detected instances utterances of a trigger word or phrase.

One approach to providing a speech-based user interface for a speech-enabled system is to use a device that monitors an acoustic environment waiting for a user to speak a command that can be interpreted by the system. The system may determine when the speaker intends to interact via the interface by determining when the speaker utters a particular word or phrase designed to "wake" the system. Such a word or phrase may be referred to as a "wakeword" or a "trigger word."

Speech recognition used to determine the words spoken and further to automatically understand the intent of the speaker may be computationally expensive, and may be beyond the computational capacity of devices that may be located in the acoustic environment being monitored. One approach to addressing the limited computational capacity of such devices is to perform some of the computation on a server coupled to the devices over a data network, for instance over the public Internet. In some such approaches, the devices send audio data to the server only after a speaker utters the wakeword, and the server performs much of the computation required to interpret the speaker's input. Furthermore, limiting sending audio data to a server to highly likely instances of a user uttering the wakeword increases privacy for the user by avoiding disclosure of unrelated audio from the user's environment.

DESCRIPTION OF DRAWINGS

FIG. 2A is a block diagram of an acoustic front end (AFE). FIG. 2B is a block diagram of a feature extractor. FIG. 2C is a block diagram of a feature analyzer. FIG. 2D is a block diagram of a trigger detector. FIG. 2E is a block diagram of a spoken language processing server.

FIG. 8A is a top layer used for parameter estimation of the TDNN with large vocabulary input. FIG. 8B is a top layer used in multi-task training using large vocabulary and trigger word training input. FIG. 8C is a top layer retaining a top layer associated with trigger word outputs.

DETAILED DESCRIPTION

Figure 1:
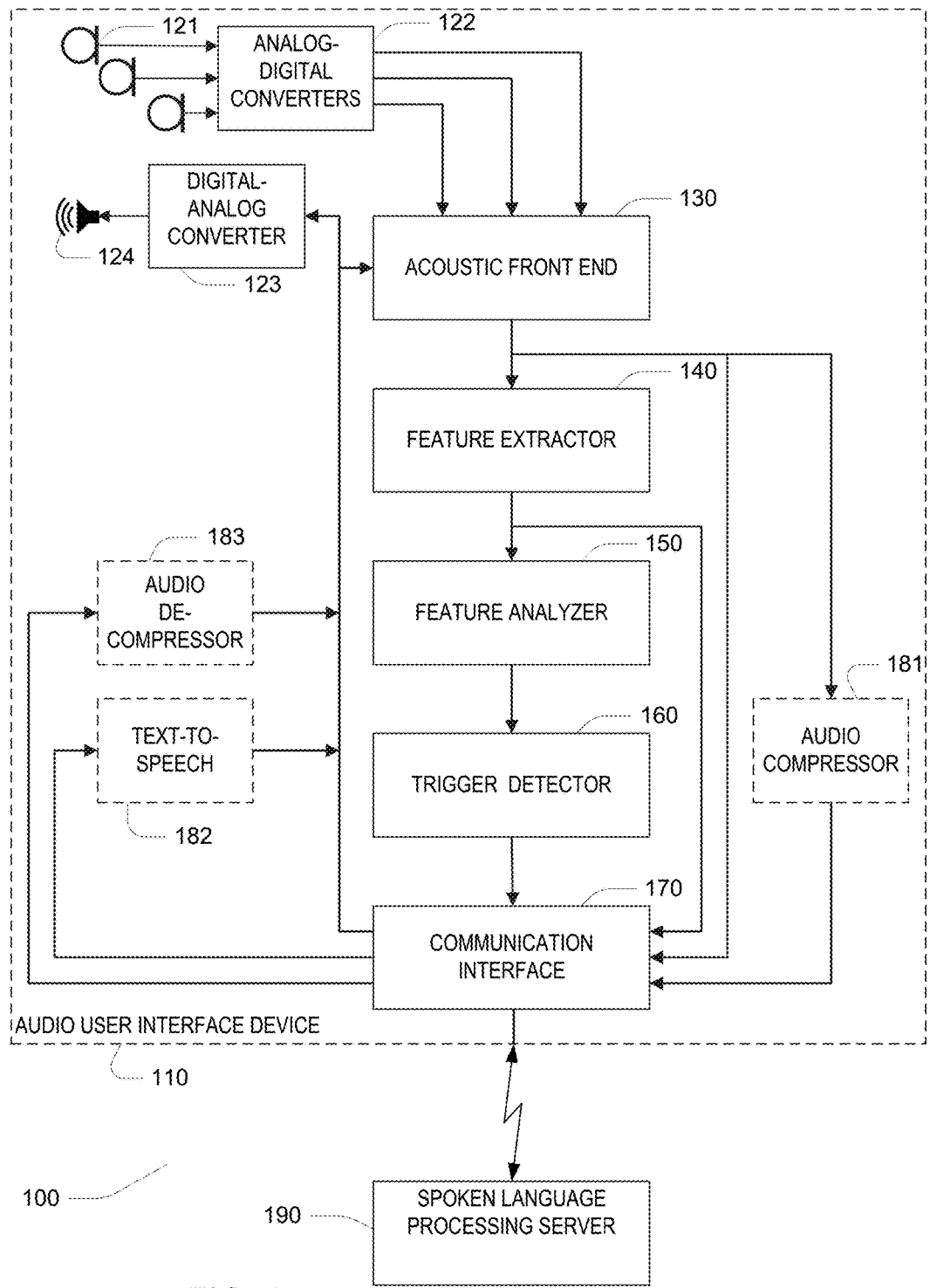
FIG. 1 is a block diagram of a spoken language processing system with an audio user interface device that uses a trigger detector.

Referring to FIG. 1, a spoken language processing system 100 includes an audio user interface device 110 and a spoken language processing system 190, which is generally distant from the device 110 and in data communication with the device over a network, for instance over the public Internet. In the embodiment shown in FIG. 1, the user interface device 110 includes one or more microphones 121, which sense an acoustic environment in which the device 110 is placed. For example, the device 110 may be placed in a living room of a residence, and the microphones acquire (i.e., sense) an acoustic signal in the environment and produce corresponding analog or digital signals, where the acoustic signal may include speech and non-speech sounds. Users in the environment may interact with the system 100. One way for a user to indicate to the system that he or she wishes to interact is to speak a "trigger" (where "trigger" is used to denote something that initiates a process or action), which may be a predetermined word or phrase (which may be referred to as a "wakeword" or "trigger word") or some other acoustically distinct event. This trigger is detected by the device 110 at a particular time (e.g., a time instance or interval), and upon detection of the trigger, the device passes audio data (e.g., a digitized audio signal or some processed form of such a signal) to a spoken language processing server 190. The device 110 selects a part of the audio data corresponding to a time including an interval of the acoustic signal from a starting time and an ending time, for example, based on an estimate of the time that the trigger began in the acoustic signal and based on a determination that input speech in the acoustic signal has ended. This server processes and interprets the user's acoustic input to the device 110 (i.e., the user's speech input) and generally provides a response to the device for presentation to the user. The presentation of the response may in the form of audio presented via a speaker 124 in the device.

One technical problem addressed by the user device 110 is limiting the amount audio data sent to the server 190. It should be recognized that sending the audio data in a continuous manner may consume excessive communication resources as well as computation resources at the server required to process that data. By limiting the sending of audio data to time intervals associated with detection of a trigger, fewer communication and computation resources are consumed. It should also be recognized that in practice, the user device may make errors in detection of the trigger, with both missed actual triggers and false alarms of triggers that are not present. The quality of the user experience is improved when missed triggers are avoided. The amount of avoidable communication and server computation is reduced when false alarms are avoided. Another technical problem may stem from the computation resources at the user device 110 being limited. There may be a need to achieve low error rates within the computation resources available at the device. Increasing computation resources at the user device may reduce error rates, but increases in cost, size, or power consumption needed for such an increase in computation resource may not be desirable or feasible.

The system 100 described below is an example of a system that provides an improved trigger detection error rate within a limited computation capacity (e.g., limits on the number of operations per second and/or the size of memory available to continuously process monitored audio) of the audio user interface device 110. Before addressing the technical features that yield this improvement, which is not merely an improvement achieved by virtue of applying computing resources to the problem, a description of the overall system is provided below.

Continuing to refer to the embodiment shown in FIG. 1, there are several stages of processing that ultimately yield a trigger detection, which in turn causes the device 110 to pass audio data to the server 190. The microphones 121 provide analog electrical signals that represent the acoustic signals acquired by the microphones. These electrical signals are time sampled and digitized (e.g., at a sampling rate of 20 kHz and 16 bits per sample) by analog-to-digital converters 122 (which may include associated amplifiers, filters, and the like used to process the analog electrical signals). As introduced above, the device 110 may also provide audio output, which is presented via a speaker 124. The analog electrical signal that drives the speaker is provided by a digital-to-analog converter 123, which receives as input time sampled digitized representations of the acoustic signal to be presented to the user. In general, acoustic coupling in the environment between the speaker 124 and the microphones 121 causes some of the output signal to feed back into the system in the audio input signals.

Figure 2A:
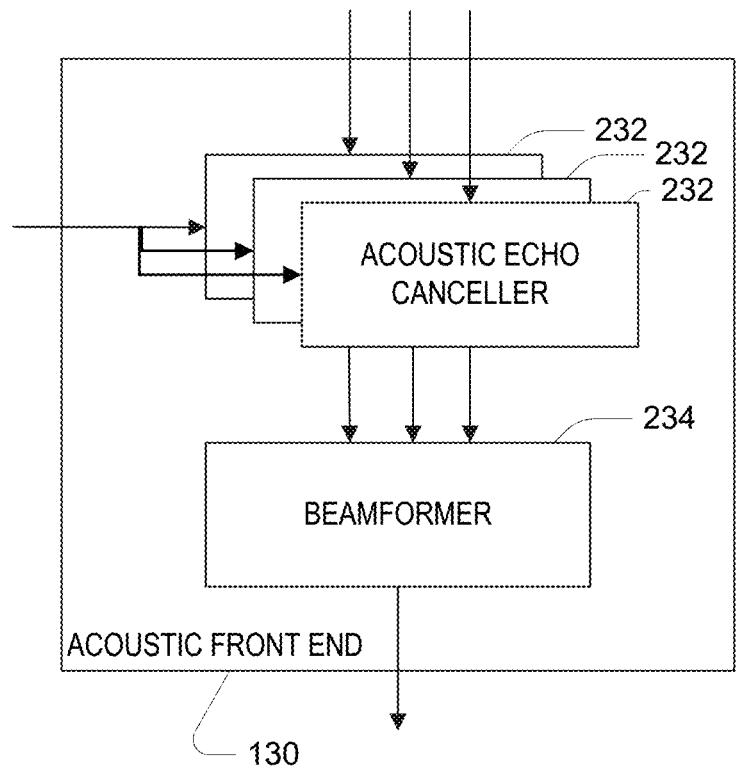
FIGS. 2A-E are block diagrams of components of the system shown in FIG. 1.

An acoustic front end (AFE) 130 receives the digitized audio input signals and the digitized audio output signal, and outputs an enhanced digitized audio input signal (i.e., a time sampled waveform). Referring to FIG. 2A, an embodiment of the signal processor 130 includes multiple acoustic echo cancellers 232, one for each microphone, which track the characteristics of the acoustic coupling between the speaker 124 and each microphone 121 and effectively subtract components of the audio signals from the microphones that originate from the audio output signal. The acoustic front end 130 also includes a directional beamformer that targets a user by providing increased sensitivity to signal that originate from the user's direction as compared to other directions. One impact of such beamforming is reduction of the level of interfering signals that originate in other directions (e.g., measured as an increase in signal-to-noise ratio (SNR)).

In alternative embodiments, the acoustic front end 130 may include various features not described above, including one or more of: a microphone calibration section, which may reduce variability between microphones of different units; fixed beamformers, each with a fixed beam pattern from which a best beam is selected for processing; separate acoustic echo cancellers, each associated with a different beamformer; an analysis filter bank for separating the input into separate frequency bands, each of which may be processed, for example, with a band-specific echo canceller and beamformer, prior to resynthesis into a time domain signal; a dereverberation filter; an automatic gain control; and a double-talk detector.

Referring again to FIG. 1, a second stage of processing converts the digitized audio signal to a sequence of feature values, which may be assembled in feature vectors. A feature vector is a numerical vector (e.g., an array of numbers) that corresponds to a time (e.g., a vicinity of a time instant or a time interval) in the acoustic signal and characterizes the acoustic signal at that time. In the system shown in FIG. 1, a feature extractor 140 receives the digitized audio signal and produces one feature vector for each 10 milliseconds of the audio signal. In this embodiment, elements of each feature vector represent the logarithm of the energy in corresponding audio frequency bands ("log frequency band energies" LFBE), the frequency bands (e.g., frequency bands spaced uniformly in a Mel frequency scale) together spanning the typical frequency range of speech. Other embodiments may use other representations of the audio signal, for example, using Cepstral coefficients of Linear Prediction Coding (LPC) coefficients rather than LFBEs.

Figure 2B:
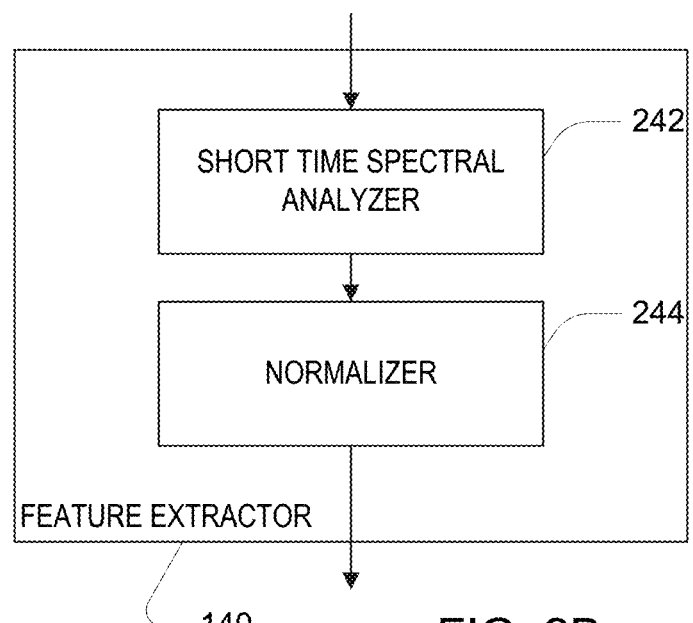

Referring to FIG. 2B, an embodiment of the feature extractor 140 includes a short time spectral analyzer 242, which accepts the audio signal, performs time windowing (e.g., over a window with a width of 25 milliseconds), Fourier analysis, and summation of energy over the ranges of the frequency bands. The output of the spectral analyzed 242 passes through a normalizer, which computes a decaying average of the computed feature vectors (optionally limiting the average over period where substantially input energy or speech-like input is received) and subtracting the average from the computed feature vectors to yield normalized feature vectors. Note that because the elements of the feature vectors in this embodiment are logarithms of energy, subtraction is effectively division in the linear energy domain. In some embodiments, the normalizer 244 also accumulates the standard deviation (square root of the variance) along with the average, and divides the elements of the feature vector with the goal of providing zero mean and unit variance elements in each dimension of the feature vectors.

Referring again to FIG. 1, the normalized feature vectors are provided to a feature analyzer 150, which generally transforms the feature vectors to a form that is directly representative of the presence of the wakeword in the original audio signal. For example, in this embodiment, the output of the feature analyzer 150 is a sequence of scalar values, referred to below as "presence values." In the embodiment shown in FIG. 1, feature vectors are provided to the feature analyzer 150 at a rate of one feature vector every 10 milliseconds (i.e., effectively "sliding" the 25 millisecond window over the signal), and a presence value is provided as output at a rate of one presence value every 10 milliseconds. In general, a presence value produced by the feature analyzer 150 may depend on not only a current feature vector, but may also depend on a history of feature vectors, for example, on 31 most recent feature vectors (e.g., with the output being delayed by 10 vectors relative to the current feature vector, the 31 vectors include 10 vectors in the "future" relative to the delayed time, and 20 frames in the "past" relative to the delayed time).

Various forms of feature analyzer 150 may be used. One approach uses probability models with estimated parameters, for instance, Gaussian mixture models (GMMs) to perform the transformation from feature vectors to the representations of linguistic content. Another approach is to use an Artificial Neural Network (ANN) to perform this transformation. Within the general use of ANNs, particular types may be used including Recurrent Neural Networks (RNNs), Deep Neural Networks (DNNs), Time Delay Neural Networks (TDNNs), and so forth. Yet other parametric or non-parametric approaches may be used to implement this feature analysis. In an embodiment described more fully below, a variant of a TDNN is used. However, it should be recognized that a DNN, for example, can alternatively be used and may in some implementations provide a preferable tradeoff between computation time, storage requirements and accuracy as compared to the TDNN approach described below.

Figure 2C:
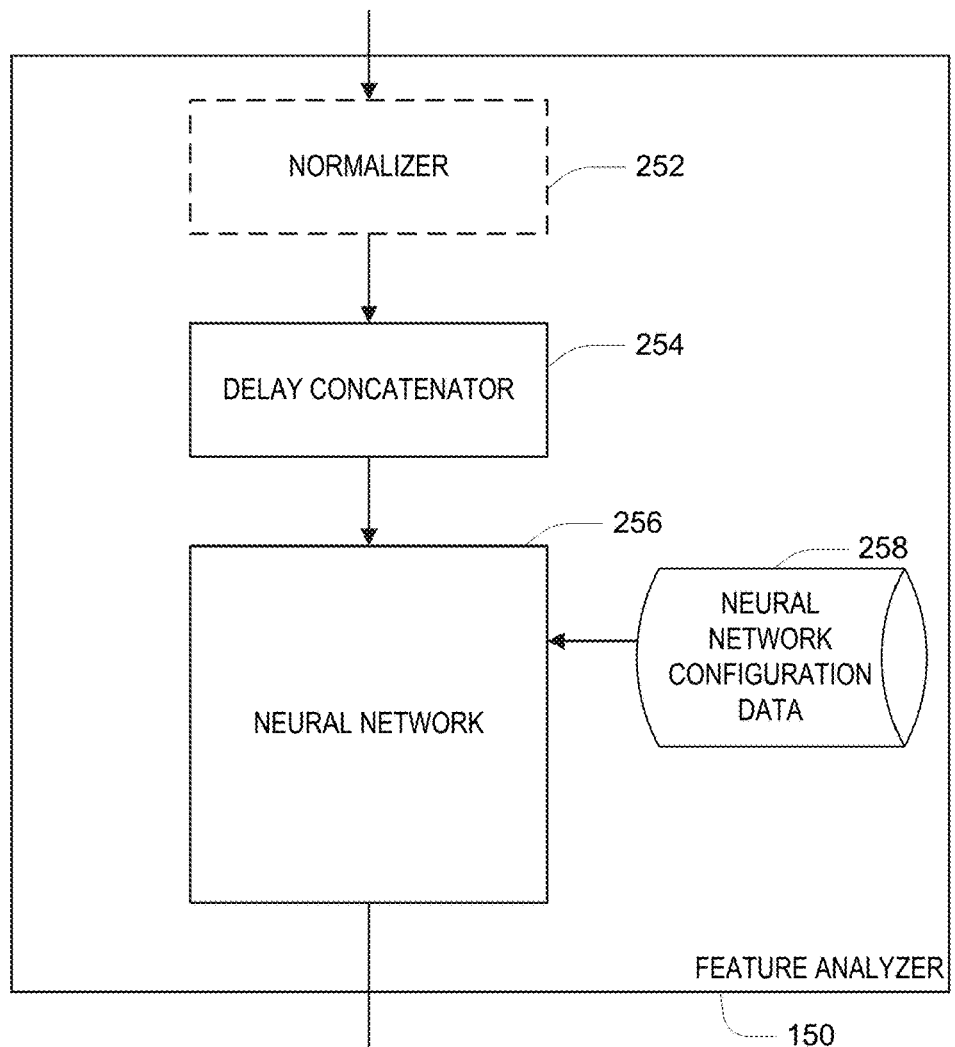

Referring to FIG. 2C, the feature analyzer 150 of FIG. 1 may include an optional normalizer 252, which transforms each feature vector so that over time, the entries of the feature vectors have zero mean and unit variance. A delay concatenator 254 receives successive feature vectors (e.g., each feature vector being a 20-dimensional real-valued vector) and outputs a delayed concatenation of the feature vectors, in some embodiments formed as the 31 most recent feature vectors (e.g., each concatenated feature vector being a 620-dimensional real-valued vector). Each of these concatenated feature vectors are passed through an artificial neural network (ANN) 256 to produce the output of the feature analyzer 150 as the outputs of the neural network 256. The neural network 256 is configured with configuration data 258, which includes parameters generally referred to as "weights" of the neural network. The configuration data may also include information governing the structure of the network, including the arrangement of nodes and links within a data flow graph representation of the neural network. Embodiments described in this document make use of a particular structure of the neural network 256, in conjunction with corresponding approaches to the determination of the configuration data in a procedure referred to as "parameter estimation" or "training," to provide high accuracy within the computational constraints of the user interface device 110.

Figure 2D:
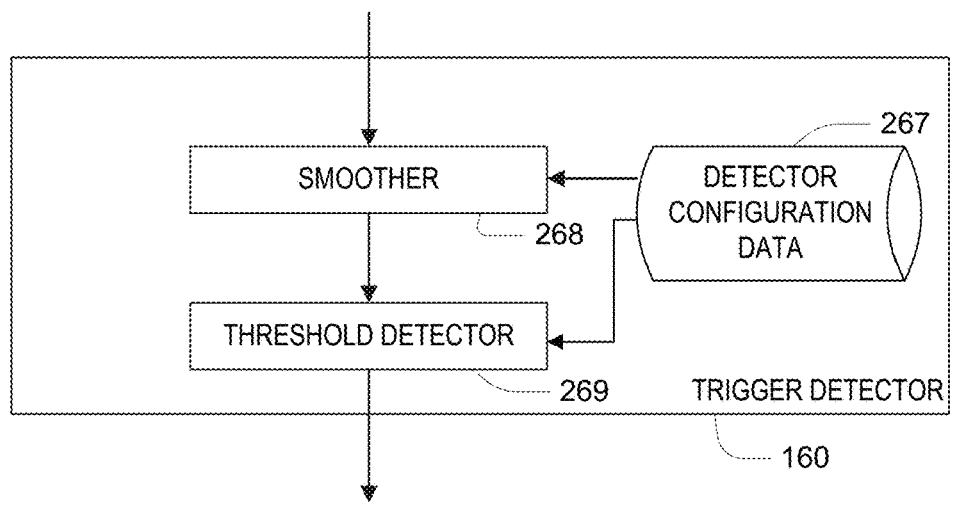

Before continuing with a description of components of the system 100 that may use of the output of the feature analyzer 150 (see FIG. 1 and FIGS. 2D-E), a more detailed description related to the neural network 256 is provided below.

Figure 3:
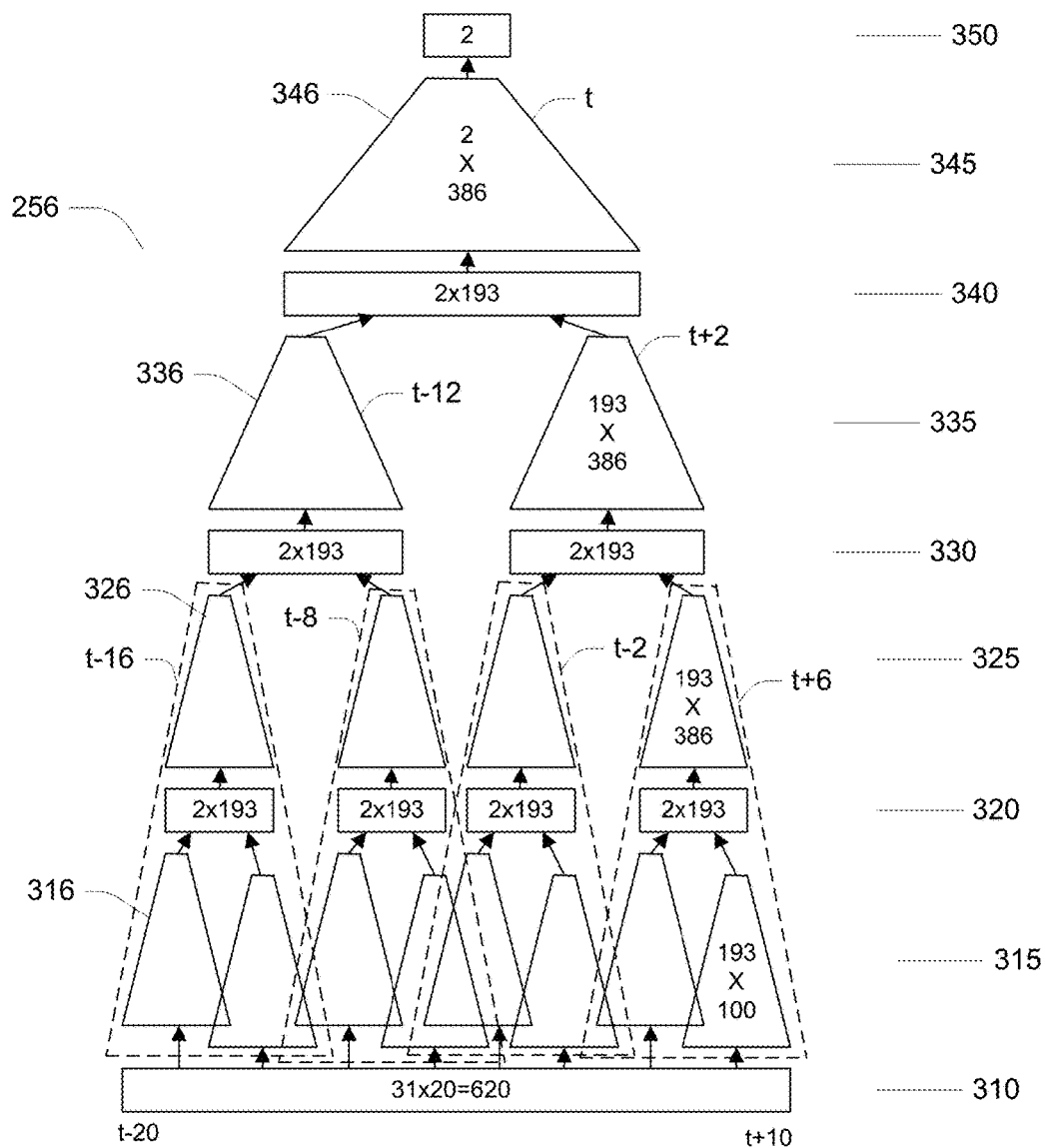
FIG. 3 is a diagram of a time delay neural network (TDNN) of a feature analyzer.

Referring to FIG. 3, the neural network 256 has a multiple layer structure, where inputs are presented at an input layer 310. A concatenation of successive feature vectors forms the input layer. It should be recognized that any concatenation of successive feature vectors corresponds to a time interval of the acoustic signal being processed, with that time interval being the overlap of the time intervals corresponding to each of the individual feature vectors (e.g., the time intervals of the sampled signal used to derive the frequency band energies). In particular, to provide an output of the neural network associated with the $t^{th}$ input frame, 10 frames in the "future", t+1, . . . , t+10, as well as 20 frames in the past, t−20, t−19, . . . , t−1, are used. Because the neural network must wait for the "future" feature vectors, the output is essentially delayed by at least the time associated with 10 frames (e.g., 10 times 10 ms.). The output of the first (i.e., input) layer 310 is therefore the 620 entries of the 31 feature vectors. The outputs of the first layer 310 are processed to provide inputs to the second layer 320. As is conventional with such neural networks, each input value to the second layer is formed as a linear weighted combination (i.e., a linear transformation) of the output values of the first layer (generally also including a constant output value). In this example, the second layer has 1,544 units. Therefore, in general, there could be as many as 620×1,544, or almost 1×10$^6$ real valued weights defining the linear transformation 315 from the first layer 310 to the second layer 320.

The neural network 256 uses a time-delayed structure, forming what may be referred to as a Time-Delay Neural Network (TDNN), in which groups of input values to the second layer 320 are formed by time delays of application of a same set of weights 316 to successive groups of output values from the first layer. In this embodiment, groups of 100 outputs of the first layer, each group corresponding to 5 consecutive feature vectors of 20 elements each (and corresponding to a time interval of the acoustic signal having an overall duration on which the feature vectors depend), are used to determine 193 inputs to the second layer. In FIG. 3, the weights used to map the first layer's outputs to the second layer's inputs are represented as weights 316 which define the linear transformation 315. In general, as many as 100×193=19,300 real values represent the element 316. These elements applied at 8 time offsets (−18, −14, −10, −6, −4, 0, +4, +8), such that the 5 input frames are centered at these offsets.

The second layer 320 can be considered to be formed of four groups of units, each with 2×193=386 units. These groups each depend on a set of input frames centered at offsets from t of (−16, −8, −2, +6), respectively. For example, the group at offset +6 has two sets of inputs, one set determined from 5 frames centered at +8 (i.e., from +6 to +10) and one set determined from 5 frames centered at +4 (i.e., from +2 to +6). Therefore, the group of units at the second layer at offset +6 depends on 9 input frames at offsets +2 to +10, which are centered at offset +6, illustrated by a grouping in a dashed line labeled t+6. Similarly, the group of units at the second layer corresponding to offset −2 depends on the input frames at offsets −6 to +2, the group correspond to offset −8 on input frames at −12 to −4, and the group corresponding to offset −16 on input frames −20 to −12. The overall mapping from input feature vectors to the sets of 193 inputs at the third later are essentially time delays of each other.

In the second layer 320, each of the 1,544 units implements a fixed non-linearity, in this embodiment a fixed sigmoidal nonlinearity, thereby performing an element-wise non-linear transformation of its inputs to form its outputs. The inputs to the third layer 330 are formed as a linear transformation 325 of the outputs of the second layer 320.

Each group of 386 outputs of a group of units of the second layer is used to determine 193 inputs to the third layer according to a set of weights 326. Each set of weights may be represented by 386×193 real values. As with the mapping from the outputs of the first layer to the inputs of the second layer, the same weights 326 are used for each group of 386 outputs. The units of the third layer 330 can be considered as two groups of 386 units, corresponding to offsets from t of +2 and −12. As with the second layer, each unit of the third layer 330 implements a sigmoidal non-linearity.

Repeating the structure at the second layer, each group of 386 outputs of the third layer 330 maps to a set of 193 inputs to the fourth layer 340 with a set of weights 336 defining a linear transformation 335, and the 386 outputs of the fourth layer 340 map to the outputs of the neural network using a set of weights 346 defining a linear transformation 345. In output layer 350 has a a pair of complementary outputs (generally designed to provide an output value and 1 minus that value), and therefore the weights 346 of the linear transformation 345 may be represented by 386×2 real values.

Figure 4:
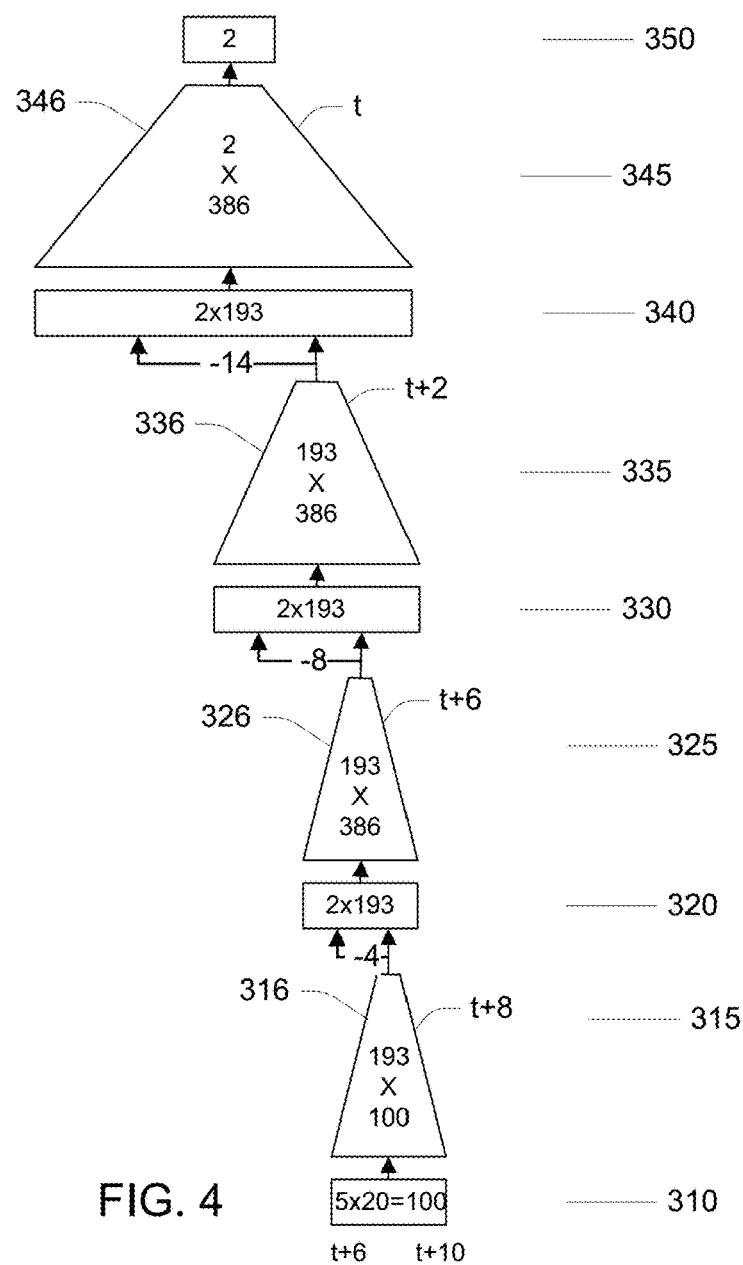
FIG. 4 is a diagram of a run-time implementation of the TDNN of FIG. 3.

Referring to FIGS. 4, it may be recognized based on the description above that the neural network 256 may be implemented efficiently by taking advantage of the time delay structure of the network. Because at each time t, the values of the input layer 310 are essentially shifted by one frame (20 values), the required sets of 193 inputs to the second layer previously been computed for all but the first (most recent) set of 5 successive frames (i.e., for offsets t+6 to t+10). Therefore, the two sets of inputs to one group of units of the second layer 320 may be obtained by computing the 193 inputs for the first set of 5 consecutive frames, and using the result of that same computation delayed by 4 frames (i.e., computed using t+2 to t+6). Similarly the inputs for one group of units of the third layer 330 may be computed using the first frames (i.e., from t+2 to t+10) and the result of that computation delayed by 8 frames (i.e., based on input frames t−6 to t+2). Further, one group of inputs at the fourth layer 340 may be computed using the first frames (i.e., t−6 to t+10) and a delay of 14 frames of that computation (i.e., based on frames t−20 to t−4). It should be evident that using this TDNN structure for the neural network 256 greatly reduces the number of arithmetic operations that have to be performed for each input frame as compared to a neural network that does not impose such structure on the weights between the layers of the network.

Figure 5A:
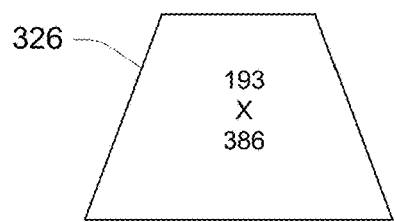
FIGS. 5A and 5B are schematic representations of a fully connected neural network interconnect and a decomposed interconnect, respectively.
Figure 5B:
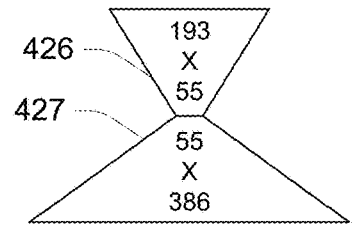

Referring to FIGS. 5A-B, the number of arithmetic operations per frame at runtime for computation of the output of the neural network 256 shown in FIG. 4 is further reduced by imposing a structure on the sets of weights. For example, considering a set of weights 326 that maps 386 outputs from one layer to 193 inputs to the next layer, in general, such a mapping may be represented using 386×193 real valued weights. Referring to FIG. 5B, to further reduce the number of arithmetic operations required, the mapping from the 386 values to the 193 values is formed as a sequence of two mappings: 386 values to 55 values, followed by 55 values to 193 values. Note that the total number of real values representing this sequence of two mappings is 386×55+55×193=31,845, yielding about half as many arithmetic operations to map the 386 values to the 193 values. Therefore, the procedure for processing the input values (i.e., 386 values) to the transformation represented in FIG. 5B includes computing intermediate values (i.e., 55 values) as a linear transformation of the input values, and then computing the output values (i.e., the 193 values) as another linear transformation of the intermediate values. For example, with reference to FIG. 4, this procedure is applied to output values at the second layer 320 to determine the result of applying the weights 326 to those values. Recall that because of the time-delay structure shown in FIG. 4, the inputs to the procedure (i.e., the 386 values at layer 320) are formed by application of the weights 316 at the previous layer to input corresponding to frames t+6 to t+10 (and the associated time interval of the acoustic signal) and a time delay (by 4 frames) of application of those weights 316 to input corresponding to frames t+2 to t+6 (corresponding to a prior time interval of the acoustic signal).

Versions of this procedure are performed at each layer 315, 325, 335, and 345 to provide an efficient implementation of the overall transformation illustrated in FIG. 3. It should be recognized that the particular numbers of inputs and outputs and intermediate value, the time delays, the number of layers, and any other parameters specified above are merely examples used in the embodiment that is described in detail, and other values of such parameters may be used in other embodiments.

In the computational structure shown in FIG. 4, each of the groups of weights 316, 326, 336 are represented in a similar decomposition with 55 intermediate values. In the specific example shown in FIG. 4, there are a total of about 87,525 weights, and a similar number of arithmetic operations required for processing each input frame using the neural network.

Referring back to FIG. 1 and FIGS. 2D-F, the presence value output of the neural network 256, which is the output of the feature analyzer 150 is provided to the trigger detector 160.

Generally, the trigger detector 160 implements a timewise smoothing of the presence a sliding window in a smoother 268 and then compares the output of the smoother in a threshold detector 269 to determine when the smoothed value exceeds a pre-defined threshold. The parameters for configuring the smoother 268 and the threshold of the threshold detector 269 are stored in the detector configuration data 267.

Figure 6:
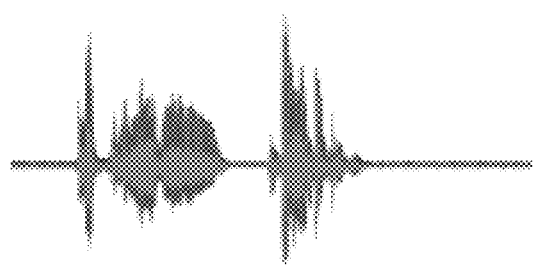
FIG. 6 is a graph of a sample waveform.
Figure 7A:
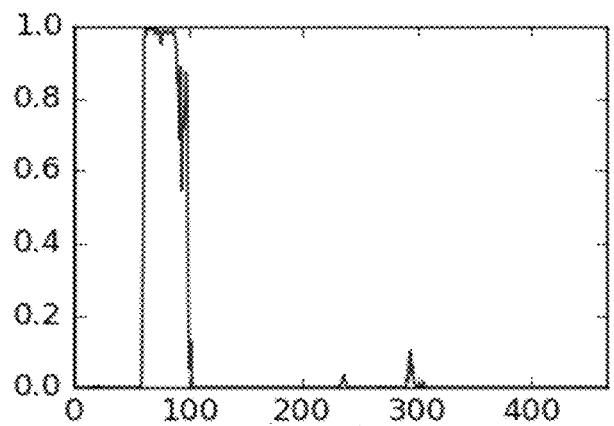
FIGS. 7A-C illustrate a presence value, a smoothed presence value, and a detector output, respectively, corresponding to the waveform of FIG. 6.
Figure 7B:
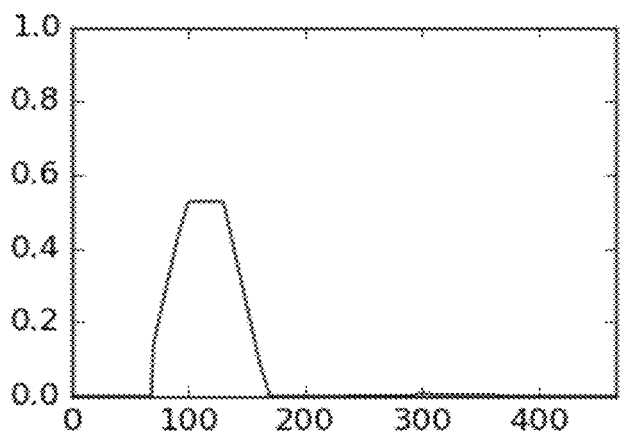
Figure 7C:
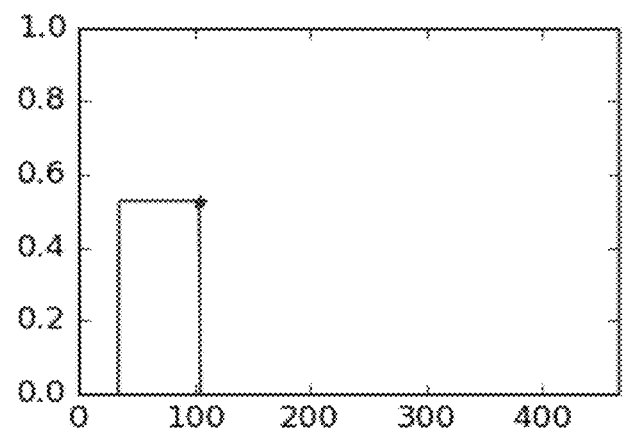

Referring to FIG. 6, an example an input speech utterance is shown as the waveform of the signal acquired by the microphone. An initial period of energy in the waveform corresponds to a user speaking the wakeword "Alexa." FIGS. 7A-C show the corresponding time aligned time evolution of (A) the presence value output from the feature analyzer, (B) the smoothed presence value output from the smoother 268, and (C) the thresholded value output from the threshold detector 269. In this example, it can be observed that for the wakeword "Alexa" at the beginning (FIG. 6), the presence value correctly outputs high values (i.e., close to 1.0) for the input corresponding to the utterance of "Alexa." The smoother 268 smooths (i.e., averages) the presence values with a rectangular sliding windows. Finally, the threshold detector 269 triggers when the smoothed value reaches a local maximum over a predefined threshold, and outputs a rectangular window that preceded that point by the equivalent of 750 ms. (i.e., 75 input feature vectors at a rate to 10 ms. per input).

It should be recognized that other forms and configurations of the trigger detector 160 may be used. For example, if the presence value is determined to correspond to the time extent of the wakeword rather than specifically to the ending time, the starting time of the wakeword may be determined by the time the presence value initially becomes large (i.e., crosses a first threshold). In some alternative embodiments, there may be multiple presence value outputs, for example, on representing a start of the wakeword and one representing the end of the wakeword.

Referring back to FIG. 1, the communication interface receives an indicator part of the input (e.g., the frame number) corresponding to the identified trigger. Based on this identified part of the input, the communication interface 170 selects the part of the audio data (e.g., the sampled waveform) to send to the server 190. In some embodiments, this part that is sent starts at the beginning of the trigger, and continues until no more speech is detected in the input, presumably because the user has stopped speaking. In other embodiments, the part corresponding to the trigger is omitted from the part that is transmitted to the server. However, in general, the time interval corresponding to the audio data that is transmitted to the server depends on the time interval corresponding to the detection of the trigger (e.g., the trigger starts the interval, ends the interval, or is present within the interval).

Figure 2E:
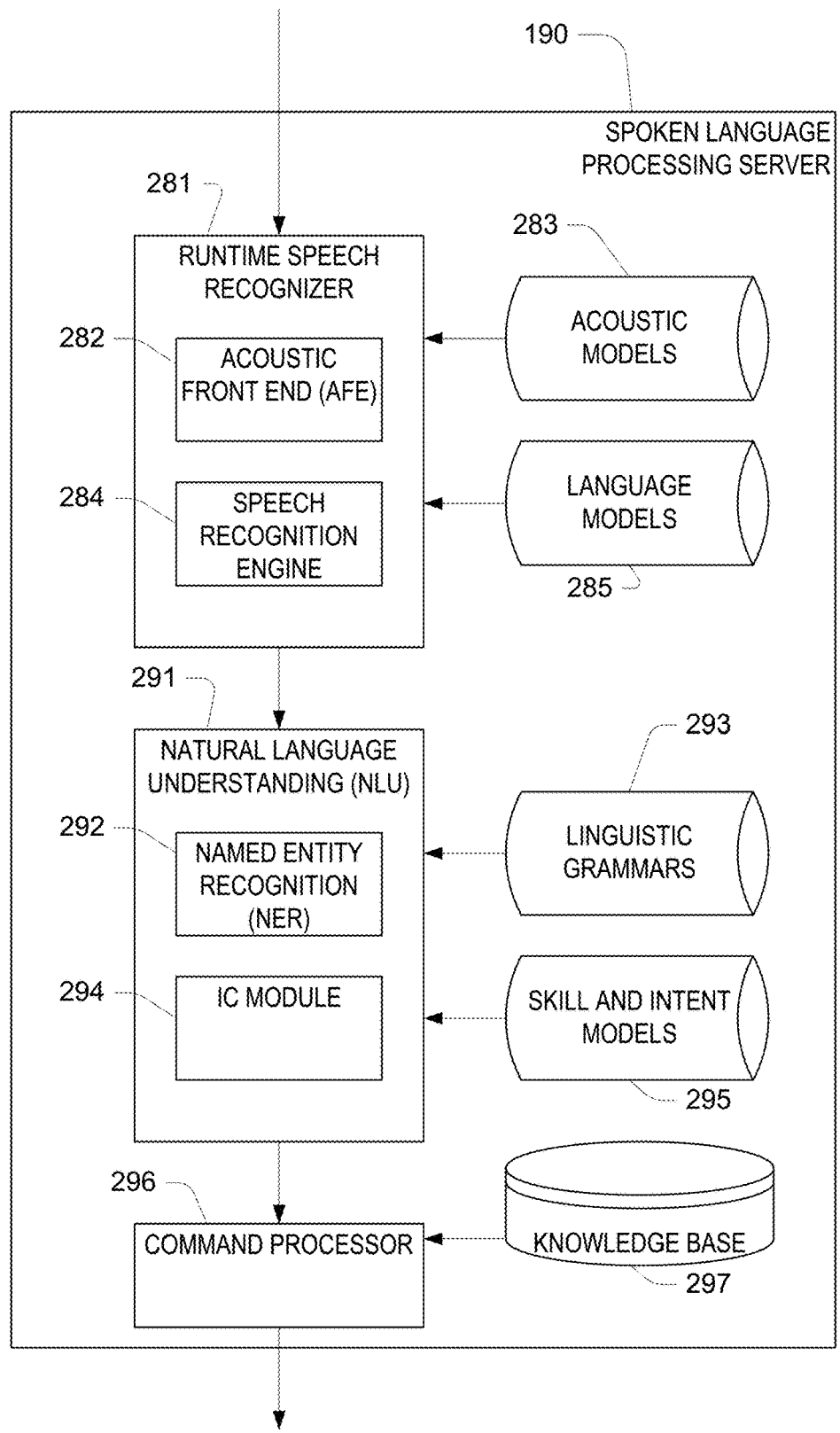

Referring to FIG. 2E processing at the spoken language server 190 may include various configurations for processing the acoustic data (e.g., the sampled audio waveform) received from the audio interface device 110. For example, a runtime speech recognizer 281 uses an acoustic front end 282 to determine feature vectors from the audio data. These may be the same feature vectors computed at the interface device 110, or may be a different representation of the audio data (e.g., different numbers of features, different number per unit time, etc.). A speech recognition engine 284 processes the feature vectors to determine the words in the audio data. Generally, the speech recognizer 281 attempts to match received feature vectors to language phonemes and words as known in the stored acoustic models 283 and language models 285. The speech recognition engine 284 computes recognition scores for the feature vectors based on acoustic information and language information and provides text as output. The speech recognition engine 284 may use a number of techniques to match feature vectors to phonemes, for example using Hidden Markov Models (HMMs) to determine probabilities that feature vectors may match phonemes. Sounds received may be represented as paths between states of the MINI and multiple paths may represent multiple possible text matches for the same sound.

Following processing by the runtime speech recognizer 281, the text-based results may be sent to other processing components, which may be local to the device performing speech recognition and/or distributed across data networks. For example, speech recognition results in the form of a single textual representation of the speech, an N-best list including multiple hypotheses and respective scores, lattice, etc. may be sent to a natural language understanding (NLU) component 291 may include a named entity recognition (NER) module 292, which is used to identify portions of text that correspond to a named entity that may be recognizable by the system. An intent classifier (IC) module 294 may be used to determine the intent represented in the recognized text. Processing by the NLU component may be configured according to linguistic grammars 293 and/or skill and intent models 295. After natural language interpretation, a command processor 296, which may access a knowledge base 297, acts on the recognized text. For example, the result of the processing causes an appropriate output to be sent back to the user interface device for presentation to the user.

The description above focusses on the runtime operation of the audio interface device 110 shown in FIG. 1. As described above, the device 110 is configured with various data, including the neural network configuration data 258, and the detector configuration data 267. The neural network configuration data includes the weights 316, 326, 336, 346 of the neural network, as discussed above. In general, the configuration data for the device 110 is computed on a data processing system that is separate from the device 110 based on representative input that includes examples of the trigger word to be detected. The configuration data may be loaded into the device before deployment or downloaded to the device 110 from time to time from a server.

Turning specifically to the procedure for determining the neural network weights, the input to the procedure include data that includes a sequence of feature vectors. The determination of the weights of the neural network generally follows a sequence of stages:
a) initialization with large-vocabular training for phonetic-based outputs;
b) multi-task learning with both phonetic-based outputs and a binary wakeword target value;
c) weight decomposition introducing the SVD-based bottleneck aspects of the neural network described above;
d) further multi-task learning; and
e) removal of the phonetic-based part of the neural network.

Figure 8A:
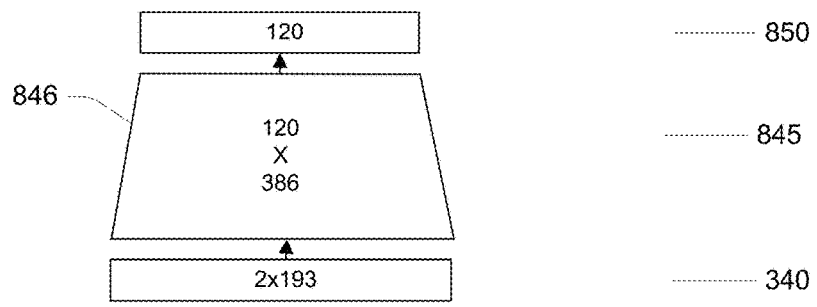
FIGS. 8A-C are top layers of a TDNN.

Referring to FIG. 8A, in the initialization stage (a), weights of the neural network are determined using an output layer 850 with outputs corresponding to state of phonemes for a large vocabulary speech recognizer. Here the layer is illustrated as having 120 units, which may correspond to 40 distinct phonemes with 3 states each, however is should be understood that a larger or smaller number of output units may be used, for example, if more phonemes (e.g., with 1000's of states of context-dependent phonemes) are used. The linear transformation 845 from the fourth layer 340 to the output layer is defined in terms of a set of weights 846. As introduced above, the input to the large vocabulary training procedure includes paired neural network inputs and outputs. The weights 846 are determined using one of a variety of parameter estimation procedures, such as a Back-Propagation gradient-based estimation procedure using a cross-entropy loss criterion.

Figure 8B:
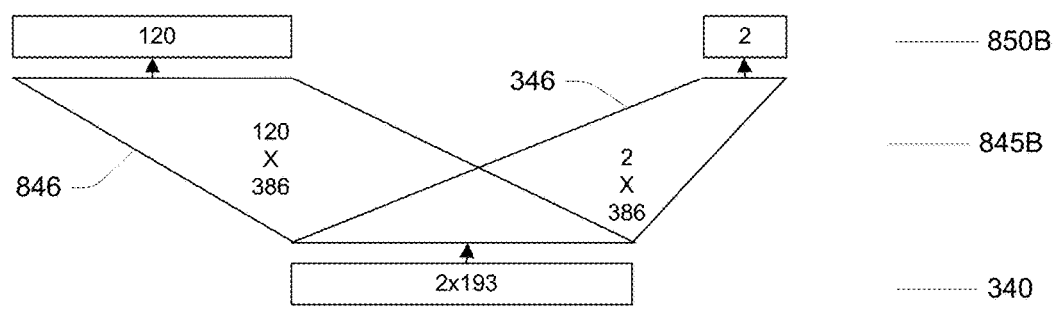

Referring to FIG. 8B, using the weights 846 of the final linear transformation 845, as well as the weights of the transformations 315, 325, 335 other layers (not shown in FIGS. 8A-C) of the remainder of the neural network, which have been initialized using the large vocabulary training data, a multi-task training stage (b) adds weights 346 to the final transformation 845B, providing in the output layer both output units corresponding to units for large vocabulary recognition as well as units for the trigger detection task (i.e., to output the desired presence value). The parameters of the neural network are further updated using training data that includes both data for the large vocabulary task as well as training data for the trigger detection task. In some implementations, the parameter estimation procedure uses a weighted cross-entropy loss criterion, for example, weighting the cross-entropy for the trigger detection task at 0.9 and 0.1 for the large vocabulary task.

Figure 8C:
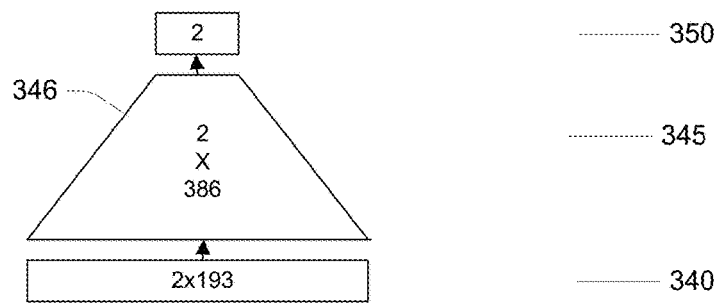

Referring to FIG. 8C, after the multi-task training stage, the linear transformations between layers are decomposed as illustrated in FIG. 5B in a decomposition stage (c). Each linear transformation is represented as a matrix transformation, and a singular value decomposition (SVD) is used to approximate the full matrix as a product of lower rank matrices. In particular, if the linear transformation from N outputs for one layer to M inputs to the next layer is represented as an N×M matrix, this matrix is decomposed into a product of an N×R matrix and an R×M matrix using a reduced rank approximation based on a singular value decomposition of the N×M matrix. The values of the two matrices are used as initial weights for the transformation of the form illustrated in FIG. 5B.

Having initialized the decomposed weights for the transformation in the neural network, a further stage (d) of multi-task training is performed using large vocabulary and trigger word training data. Finally, at stage (e) and as illustrated in FIG. 8C, only the weights 346 of the final linear transformation 345 are retained for the neural network configuration data 258, which is used in the runtime operation of the audio user interface device 110 as described above.

Note that in the description above, particular numbers of concatenated frames, particular time delays, particular numbers of units in layers of the neural network, and so forth, are provided by way of illustrative example. However, it must be recognized that these are only exampled. Different numbers of layers, units in each layer, size of the SVD decomposition (e.g., R above), and so forth may be chosen to achieve selected tradeoffs between computation resources (processor instructions per second, size of memory) required and achieved accuracy.

Furthermore, although described in the context of an interface device that both has the microphones integrated into the device and a processor for execution of instructions that implement the processing for detecting the triggers, the microphones for acquiring the acoustic signals may be separate from the interface device, for example, providing an analog or digitized audio signal over a communication link (e.g., a radio link or a data communication link). Furthermore, some or all of the function of the spoken language processing server 190 may be integrated into the device 110, while still benefitting from the technical advantage of limiting the amount of the audio data that must be processed by such function. For example, certain computation resources in such a device may be in a low-power mode until the trigger is detected when they are used for the spoken language processing of the audio data.

In an alternative embodiment, instead of considering every feature vector output from the feature extractor 140, these outputs may be subsampled, for instance retaining every other output, or more generally retaining every $n^{th}$ output. For example, skipping every other feature vector output can reduce the overall computation by almost a factor of two.

In an alternative approach to determining the parameter values (i.e., weights) of the neural network, a large "teacher" network (e.g., a fully connected deep neural network) is first constructed and its parameters determined on the training set of large vocabulary and binary presence value targets. Generally, such a larger network may provide higher accuracy than using a network of the form described above, but may have computational requirements that make it unsuitable for runtime use. Then, rather than performing the parameter determination using binary target values for the presence value and the phonetic outputs, the outputs of the teacher network are used as "soft" targets. In a related similarly-motivated approach, the training of the network may make use of the output of another trigger detector, for example, a deep neural network with a substantially larger number of parameters. In yet another alternative approach, the technique described above is used as a preliminary stage before application of Hidden Markov Model (HMM) and/or Support Vector Machine (SVM) stage(s). In an implementation of this alternative, the technique described in the present application may be hosted of a digital signal processor, with the subsequent stages being hosted on a general-purpose processor.

In some alternatives, the presence value outputs may be augmented to explicitly detect the input patterns corresponding to known sources of false alarms, such as audio media advertisements that include the wakeword. In this way, these negative examples are explicitly identified by the neural network and excluded from triggering the user interface.

In yet another alternative, the feature extractor 140 is not required, and the neural network 256 directly inputs waveform samples. Further layers may be added to the neural network and trained to extract features on audio samples directly. In the case of there being multiple microphones, this waveform sample input may be extended to provide multiple streams of waveform sample inputs from corresponding different microphones. In this way, essentially beamforming in one or more predetermined directions is essentially implemented by the neural network.

In some embodiments, rather than there being a single trigger word, the system may be configured to trigger on two or more events, and the system may act differently depending on which event is detected. For example, the system may be configure to detect a wakeword, such as "Alexa," and may also be configured to detect a command such as "stop," which may be acted on immediately by the interface device. In the case of multiple triggers, each trigger may have a pair of outputs from the neural network.

The approaches described above may be implemented in software, in hardware, or using a combination of software and hardware. For example, the software may include instructions stored on a non-transitory machine readable medium that when executed by a processor, for example in the user interface device, perform some or all of the procedures described above. Hardware may include special purpose circuitry (e.g., Application Specific Integrated Circuits (ASICs), Field Programmable Gate Arrays (FPGAs) and the like) for performing some of the functions. For example, some of the computations for the neural network transformations may be implemented using such special purpose circuitry.

It is to be understood that the foregoing description is intended to illustrate and not to limit the scope of the invention, which is defined by the scope of the appended claims. Other embodiments are within the scope of the following claims.

What is claimed is:

1. A method for selective transmission of sampled audio data to a speech processing server according to detection of a trigger being represented in the audio data, the method comprising:
    receiving sampled audio data based on an acoustic signal acquired by one or more microphones in an acoustic environment;
    processing the sampled audio data to locate instances of the acoustic trigger in the acoustic signal, wherein processing the sampled audio data includes
        computing a sequence of feature vectors from the sampled audio data, each feature vector in the sequence being associated with a time in the acoustic signal and representing spectral characteristics of the acoustic signal at said time,
        for each time of a succession of times, forming a set of feature vectors, each feature vector corresponding to a time at a predetermined respective offset from said time, providing the set of feature vectors as an input to an artificial neural network, and computing an output from the artificial neural network indicating a presence of the trigger at said time, and
        processing the outputs from the neural network for the succession of times to determine a first time corresponding to occurrences of the trigger in the acoustic signal, the first time corresponding to an extreme value of the outputs from the artificial neural network detected over the succession of times;
    selecting a portion of the sampled audio data for transmission to the speech processing server according to the first time, corresponding to the extreme value of the outputs from the artificial neural networks detected over the succession of times, corresponding to the instances of the trigger; and
    transmitting the selected portion of the sampled audio data to the speech processing server.

2. The method of claim 1, wherein computing the output of the neural network includes performing a series of data transformations, wherein at least one of the data transformations includes:
    determining an input to the transformation as a combination of an output from a prior transformation in the series and one or more time-delayed outputs from the prior transformations, the input having a number of input data elements,
    computing intermediate data elements from the input data elements as a linear transformation of the input data elements, the intermediate data elements having a number of intermediate elements that is less than the number of input data elements, and
    determining output elements of the data transformation as a linear transformation of the intermediate data elements followed by an element-wise non-linear transformation, the output elements having a number of output elements greater than the number of intermediate elements.

3. The method of claim 1, wherein transmitting the audio data comprises transmitting sampled waveform data.

4. The method of claim 1, wherein the at least one of the data transformations comprises each of the data transformations in the series of data transformations.

5. The method of claim 1, wherein processing the outputs from the artificial neural network to determine the first time corresponding to the occurrence of the trigger includes filtering the output of the artificial neural network and determining a time of an extreme value in the output of the filtering.

6. A method for processing audio data, said method comprising
   accepting audio data based on an acoustic signal acquired by a microphone in an acoustic environment,
   identifying a first part of the audio data, said first part corresponding to an occurrence of a trigger at a first time in the acoustic signal, and
   selecting a second part of the audio data for further processing based on the first part, which was identified as corresponding to the occurrence of the trigger,
   wherein identifying the first part includes
      computing a sequence of feature values from the audio data, each feature value in the sequence being associated with a respective time in the acoustic signal, for each time of a succession of times,
         forming a set of feature values, each feature value being associated with a time at a respective predetermined offset from said time,
         providing the set of feature values as an input to an artificial neural network, and
         computing an output from the artificial neural network indicating a presence of the acoustic trigger at said time,
   wherein identifying the first part further includes
      processing the outputs from the neural network for the succession of times to determine the first time, the first time corresponding to an extreme value of the outputs from the neural network over the succession of times and
      processing the acoustic data according to a first procedure, wherein the first procedure includes
         determining input data values to a second transformation as an output of a first transformation with input comprising a first part of the audio data corresponding to a first time interval of a first duration of the acoustic signal and at least one delayed output of the first transformation with input comprising a second part of the audio data corresponding to a prior time interval of the acoustic signal having the first duration, the input data values having a number of the input data values,
         computing intermediate data values using the input data values as a first linear transformation of the input data values, the intermediate data values having a number of the intermediate values less than the number of the input data values, and
         determining output values of the second transformation as a second linear transformation of the intermediate data values followed by an element-wise non-linear transformation, the output values having a number of output values greater than the number of intermediate values, wherein identifying the first part of the audio data is based on multiple applications of the first procedure to parts of the audio data corresponding to different time intervals of the acoustic signal,
         wherein the second transformation is representable as a matrix of size N-by-M, where N is the number of input values and M is the number of output values,
         wherein the first linear transformation is representable by a matrix of size N-by-R, where R is the number of intermediate data values, R being less than N and less than M,
         wherein the second linear transformation is representable by a matrix of size R-by-M, and
         wherein the matrix of size N-by-M is a matrix product of the matrix of size N-by-R and the matrix of size R-by-M.

7. The method of claim 6, wherein each feature value comprises a feature vector that represents spectral characteristics of the acoustic signal.

8. The method of claim 7, wherein computing the sequence of feature values comprises performing a spectral analysis representing the acoustic signal at the respective time.

9. The method of claim 6, wherein each feature value comprises sampled waveform values that represent the acoustic signal.

10. The method of claim 6, wherein processing the outputs from the neural network comprises filtering the outputs to yield filtered outputs, determining an extreme value of the filtered outputs, and determining a time interval for the occurrence of the trigger according to a location of the extreme value in the filtered output.

11. The method of claim 6, wherein selecting the second part of the audio data includes selecting the second part to correspond to a second time of the acoustic signal, wherein the second time is determined from the first time.

12. The method of claim 11, wherein the first time comprises a start time of the trigger and wherein a time interval beginning at the start time of the trigger comprises the second time.

13. The method of claim 6, wherein the matrix of size N by R and the matrix of size R by M are based on a Singular Value Decomposition (SVD) of the matrix of size N by M.

14. The method of claim 6, further comprising determining the matrix of size N-by-R and the matrix of size R-by-M by estimating values of entries of the matrix of size N-by-M using an iterative procedure using training data, applying a Singular Value Decomposition to determine the matrix of size N-by-R and the matrix of size R-by-M from the matrix of size N-by-M, and further updating the values of the entries of the matrix of size N-by-R and the matrix of size R-by-M using the iterative procedure using the training data.

15. The method of claim 6, wherein identifying the first part of the audio data comprises computing data values representing spectral content of the acoustic signal, wherein the input data values to the second transformation depend on the data values representing the spectral content.

16. The method of claim 6, wherein the first procedure further includes performing a series of transformations, said series of transformations including the first transformation, the second transformation, and one or more further transformations, wherein performing at least one transformation of the one or more further transformations includes
   assembling an input to the transformation as a combination of an output from a prior transformation in the series and one or more time-delayed outputs from the prior transformations, the input having a number of input data elements,
   computing intermediate data elements from the input data elements as a linear transformation of the input data elements, the intermediate data elements having a number of intermediate elements smaller that is less than the number of input data elements, and
   determining output elements of the data transformation as a linear transformation of the intermediate data elements followed by an element-wise non-linear transformation, wherein the number of output elements is greater than the number of intermediate elements.

17. The method of claim 16, wherein the one or more delayed outputs from the prior transformation comprise a subsampling of outputs of the prior transformation.

18. The method of claim 6, wherein the first procedure comprises applying an artificial neural network (ANN) procedure to data values computed from the audio data.

19. The method of claim 18, wherein applying the artificial neural network procedure comprises applying a time-delay neural network (TDNN) procedure.

\* \* \* \* \*